United States Patent [19]

Mathis et al.

[11] Patent Number: 5,054,019
[45] Date of Patent: Oct. 1, 1991

[54] TRANSFER DIRECTION TURNAROUND IN NETWORK DATA COMMUNICATIONS

[75] Inventors: Joseph R. Mathis, Georgetown; Gerald L. Rouse, Round Rock, both of Tex.

[73] Assignee: International Business Machines Corporation, Armonk, N.Y.

[21] Appl. No.: 297,777

[22] Filed: Jan. 13, 1989

[51] Int. Cl.⁵ .......................... H04B 3/20; H04L 5/16
[52] U.S. Cl. ........................................ 370/31; 375/7; 370/24
[58] Field of Search ................... 370/94.1, 24, 29, 32, 370/15, 31; 375/7, 8, 31, 121; 371/32, 33

[56] References Cited

U.S. PATENT DOCUMENTS 4,689,735  8/1987  Toyonaga et al. ................. 370/94.1
4,689,786  8/1987  Sidhu et al. ........................ 370/94.1
4,751,510  6/1988  de Saint Michel et al. ............ 375/8
4,894,847  1/1990  Tjahjadi et al. ..................... 375/121

Primary Examiner—Douglas W. Olms
Assistant Examiner—Wellington Chin
Attorney, Agent, or Firm—Kenneth C. Hill; Andrew J. Dillon

[57] ABSTRACT

In a network communications system, data is transferred from a first node to a second node. When requested, the second node can transmit a data direction turnaround message to the first node, followed by transferring data to the first node. Data transfer in both directions is made during a single communications link within the network. The turnaround message can function as an acknowledgement of successful transfer to the data transferred from the first node to the second node.

12 Claims, 2 Drawing Sheets

TRANSFER DIRECTION TURNAROUND IN NETWORK DATA COMMUNICATIONS

CROSS-REFERENCE TO RELATED APPLICATION

The present application contains subject matter related to copending application Ser. No. 297,776, titled SYSTEM AND METHOD FOR DATA COMMUNICATIONS, filed on Jan. 13, 1989 and assigned to the assignee hereof, and which is hereby incorporated by reference hereinto.

BACKGROUND OF THE INVENTION

1. Technical Field

The present invention relates generally to computer systems, and more specifically to data transfer protocols between computer systems.

2. Background Art

In communication networks between computer systems, the communication links can be represented as a graph with each attached computer system and specialized server device represented as a node. Data is passed between the nodes using an agreed on protocol which is determined by the designer of the network. Typically, data is transmitted using synchronous serial communications. Data and control messages are bundled in discrete packets also called frames, each of which contains addressing information, data or a control message, and error checking values.

Many networks are dynamically switched, so that a connection between two nodes on the network may pass through one or more intermediate switches. Different communication sessions between the same two nodes may be routed through different physical connections.

Because of various delays and competition for resources inherent in communication networks, various conflicts can arise. These conflicts involve the timing of data accesses to remote nodes, and can be important when certain shared resources, such as network file servers, are accessed.

Two-way transmission of data between nodes is generally accomplished as two separate transactions. When a local node transmits information to a remote node, a communications link is set up for that transfer. Once the transfer is complete, the communications link is disconnected. If the remote node needs to send a reply, a new communications link is initiated and the transfer to the local node is made over the new link.

In some situations, it is necessary for a local node to be able to transmit data to and receive data from a remote node in a single transaction. This prevents interference from third party nodes during the time between closing of a transmission link in one direction and initiating a new link in the other direction. This situation is similar to certain bus conflicts found in computer systems, in which certain "atomic operations" cannot be interrupted by other devices attached to the computer system bus. The operation "test-and-set" on multiprocessing systems typifies this type of atomic operation.

It would be desirable for a network protocol to support atomic link operations, in which a single communications link can support data transfer in both directions. It would further be desirable for such a network protocol to support atomic link operations on a network in which, before data is transmitted from one node to another, the receiving node must transmit to the sending node information defining the environment of the receiving node.

SUMMARY OF THE INVENTION

It is therefore an object of the present invention to provide a data communication system which allows data to be transferred to, and received from, a remote node in an atomic link operation.

It is another object of the present invention to provide a data communication system which allows an atomic link operation on a network which requires a receiving node to define its environment before data can be transmitted to such receiving node.

It is a further object of the present invention to provide a data communication system in which an initiating node can transfer information to a target node and request a lock of the target node which, if granted, causes the target node to transmit data to the initiating node.

Therefore, in accordance with the present invention, a communication system provides at least first and second nodes connected to a network. The first node can request an atomic link operation from the second node. If the second node grants such request, it sends a turnaround message to the first node. This causes the direction of data transfer on the communications link between the nodes to reverse, and the second node transmits data to the first node.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
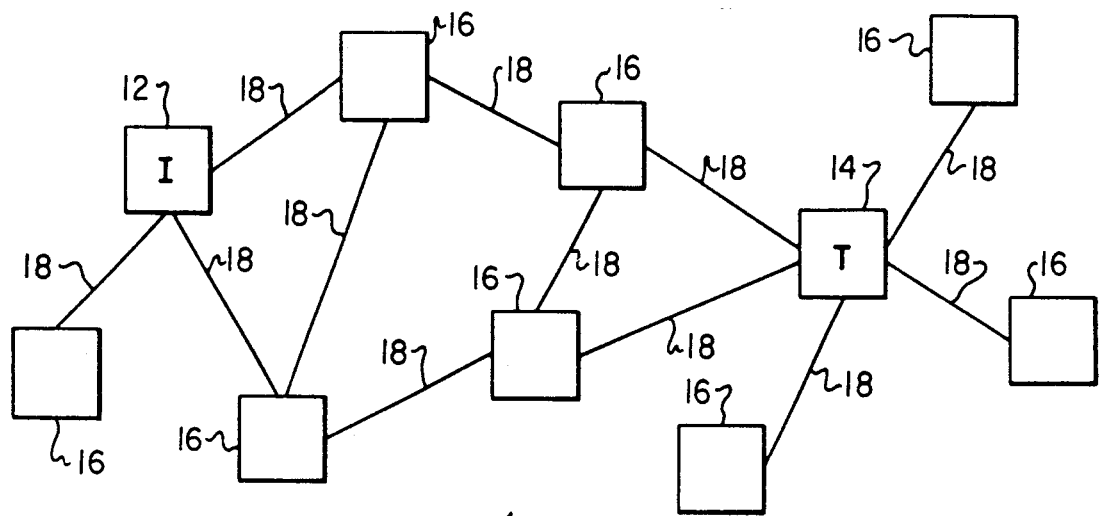
FIG. 1 a block diagram of a communications network.

Referring to FIG. 1, a network 10 contains a plurality of nodes. An initiating node 12, as described below, initiates a communications session with a target node 14. The remaining, intermediate nodes 16 form the rest of the network 10.

Each of the nodes 12, 14, 16 may be computer systems, terminals, printers, file servers, or any other type of device which may be connected together to form a network. A node 16 may also represent a gateway to another network.

The nodes are interconnected by wired connections 18. The network shown in FIG. 1 is not intended to be representative of any particular network arrangement. The technique of the present invention is equally applicable to star, token-ring, packet switched, and other network topologies. The network 10 is preferably dynamically switched, so that two different communication sessions may transfer data between nodes 12 and 14 using a different set of connections 18 and intermediate nodes 16.

In the description which follows, initiating node 12 will also be referred to as node I. Target node 14 will also be referred to as node T.

Figure 3:
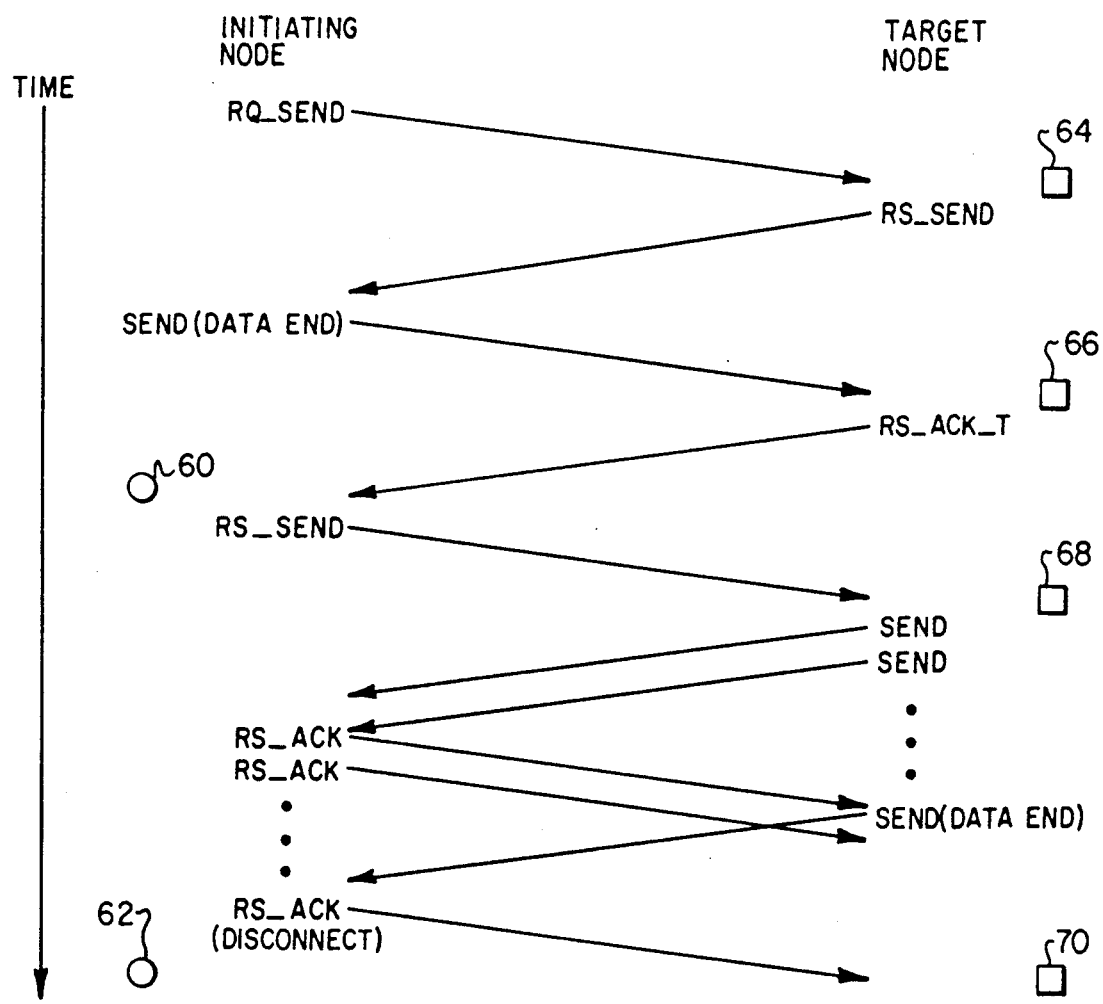
FIG. 3 is a diagram illustrating the timing and control signals of a communication session between two nodes.
Figure 2:
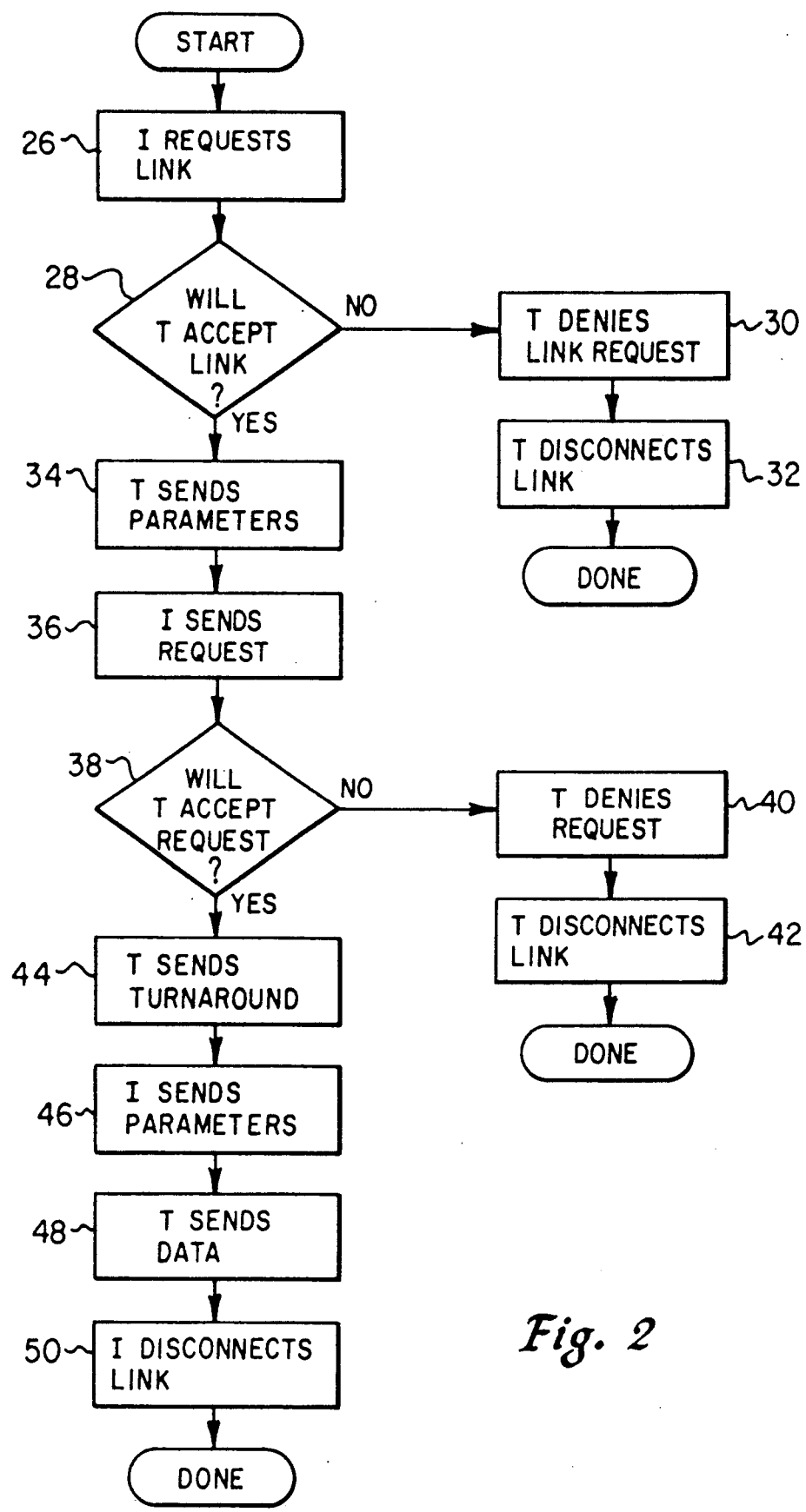
FIG. 2 is a flowchart illustrating the operation of a data direction turnaround on a communications link.

The communication protocol described in connection with FIG. 2 and 3 is described in detail in copending patent application Ser. No. 297,776, titled SYSTEM AND METHOD FOR DATA COMMUNICATIONS, which has been incorporated by reference herein. The protocol described in such copending application is utilized herein as a preferred embodiment, but is not required to practice the present invention.

In the communication protocol utilized in a preferred embodiment, a communications link may be established by a sending device which wishes to transmit data to a receiving device. The sending device initiates the transmission by sending a control message to the receiving device, which responds by returning a control message which contains parameters defining the environment of the receiving device. This environment can include information such as the number of receive buffers available in the receiving device, and their size.

Once the sending device has received these environment parameters, it sends data in blocks which can be accommodated in the receiver's buffers. As the receiver removes each block from a buffer, it transmits an acknowledge message to the sender. By keeping track of the acknowledge messages, the sender can control the data transfer and detect certain types of transfer errors. The details of such communications protocol are described further in the above referenced copending application.

Referring to FIG. 2, a flowchart illustrating data transfer by an atomic link operation between the initiating node 12 and the target node 14 is shown. I requests the atomic operation, and T permits it and performs the transmission direction turnaround. Node I initiates a communication with node T by requesting a communications link 26. This is accomplished by sending a control message to node T requesting communication. T determines whether it will accept a link request 28. If not, T denies the request 30 and disconnects the link 32. If T will accept the request, T sends parameters 34 which describe its operating environment. As described above, these parameters preferably include the number of available buffers in node T, and their size.

Once it has received the parameters, node I sends its request 36 to node T. This request is sent as data which is transferred to the target node in the normal manner for data transfers. The request asks the target node to perform an atomic operation consisting of changing the direction of data communication between the initiating and target nodes without terminating the communication link and establishing a new link.

The target node decides whether it will accept the atomic action request 38. This decision can be based on a number of factors, such as whether the target node is capable of supporting such a request at the current time, and whether the initiating node has the authority to request such an operation. If, for whatever reason, the target node does not accept the request, it sends a control message to node I denying the request 40 and disconnecting the communications link 42.

If the target node will accept the request, it transmits a turnaround message 44 to the initiating node. The turnaround message provides several functions. It acts as an acknowledgement to the last data block transmitted by the initiating node. It also indicates that the request was granted, implying that data transmission will now change direction, and acts as a request to transmit data to the initiating node.

In response to the turnaround message, the initiating node I transmits its receiving parameters 46 to the target node T. As described above, these parameters preferably include the number of available buffers in node I, and the buffer size. The target node T then sends data 48 to the initiating node I. The final block of data contains a flag which indicates that it is the final data block of this transfer. When the initiating node I acknowledges the final block of data, it disconnects the communication link 50 and the atomic operation is complete.

FIG. 3 shows the timing and preferred data and control messages used in a transfer such as described in connection with FIG. 2. The message RQ_SEND is a control message requesting permission to transmit information. RS_SEND is the control message granting permission to transfer data, and providing the environment parameters described above. The message SEND is a block of data, also referred to as a data frame. The signal RS_ACK is the acknowledgement message indicating that a data frame has been received and emptied from the receive buffer.

RS_ACK_T is the turnaround message described in connection with FIG. 2. SEND(data end) is a data frame which includes a flag indicating that this is the final data frame of a transmission. RS_ACK(disconnect) is the acknowledgement signal transmitted in response to a SEND(data end) data frame, and acts to disconnect the communications link between the initiating node and the target node.

The circles 60 and 62 indicate interrupts to the initiating node, and the squares 64, 66, 68, and 70 indicate interrupts to the target node. These interrupts 60 through 70 indicate times at which it may be necessary for the processor controlling the node to perform a software routine prior to continuing the communication process. This routine typically makes decisions about the process, including deciding whether to continue.

The initiating node begins the transfer by sending RQ_SEND to the target node. This establishes the communications link and requests permission to transmit data to the target node. Interrupt 64 is raised at the target node to allow its processor to determine whether to accept a communication. If the target node grants permission to send data, it indicates this fact and defines its environment using RS_SEND. If the target node does not grant such permission, it sends the reply RS_NAK (not shown). The initiating node then begins sending data with the SEND message. In FIG. 3, only transfer of a single SEND frame is shown, but any number of frames may actually be transmitted by the initiating node at this time. If more than one SEND frame is transmitted to the target node, the initiating node expects to receive an RS_ACK for each frame transmitted, except for the last one. The last frame contains a flag indicating that it is the last data frame.

Included in the data transferred from the initiating node to the target node is a request to perform an atomic link operation. When the SEND(data end) is received by the target node, interrupt 66 causes the processor associated with the target node to analyze the request for an atomic operation included in the transferred data. If the target node does not accept the request, a control message RS_NAK (not shown) is returned to the initiating node, indicating that the request is not acknowledged. The RS_NAK message also causes the communications link to be disconnected. In the example shown in FIG. 3, the request is acknowledged, and the control message RS_ACK_T is transmitted to the initiating node. This message causes an interrupt 60 in the initiating node, which signals that the previous SEND sequence was successful and the request for an atomic link is granted, and allows the initiating node to undertake whatever processing is necessary prior to receiving data.

As described above, one of the functions of RS_ACK_T is to initiate a data transfer from the target node to the initiating node. After the interrupt 60, the initiating node returns RS_SEND, which defines its operating environment and gives the target node permission to begin transmitting data. Interrupt 68 is used by the target node to process this grant of permission, after which the target node begins transmitting data in SEND frames.

The initiating node responds to each SEND with an RS_ACK, which is used to verify correct data transmission as described above. The last data block is transmitted with a SEND(data end), which is acknowledged by RS_ACK(disconnect). The disconnect signal raises interrupts 62, 70 to both nodes to indicate that data transfer is complete.

In reply to the SEND(data end) transmitted by the target node, it is possible for the initiating node to reply with an RS_ACK_T message instead of RS_ACK-(disconnect). This message would request another reversal of data direction, allowing the initiating node to transmit further data to the target node. The process of sending consecutive blocks of data, followed by an RS_ACK_T message, may be repeated as often as desired. This would allow a large number of data direction reversals to be made without disconnecting the current communications link and establishing a new one. However, in most cases it will not be necessary to perform more than a single turnaround. In addition, an extended operation in which the communications link is locked may have undesired effects upon operation of the remainder of the network.

As will be appreciated by those skilled in the art, the embodiment described above provides for an operation on a networked system which locks a communications link for bidirectional data transfer. A special control command is used to turn the data transfer direction around. Such an operation can be used when it is necessary to transfer data in both directions between two nodes on a network without the possibility of an intervention by a third node. This operation is similar to a test-and-set command used in a multiprocessing computer system, except that it operates over a distributed network. In a communications system which requires each data packet to be separately acknowledged, a modified acknowledge message can be used to signal the data direction turnaround.

While the invention has been particularly shown and described with reference to a preferred embodiment, it will be understood by those skilled in the art that various changes in form and detail may be made therein without departing from the spirit and scope of the invention.

We claim:

1. A system for communicating data, comprising:
a first device for transmitting and receiving data;
a second device for transmitting and receiving data; and
a communications network coupled to said first and second devices for transmitting data therebetween;
wherein said first device creates a communications link over said communications network and transmits data to said second device and wherein, after such transmission, said second device transmits, using the same communications link, a data direction turnaround message for signalling to said first device that said second device is preparing to send data to said first device, followed by transmitting data from said second device to said first device.

2. The system of claim 1, wherein data is transmitted over said communications link in frames, and wherein said first device and said second device, after they receive each frame, transmit to the other device an acknowledge message to indicate receipt of a data frame.

3. The system of claim 2, wherein the data turnaround message also functions as an acknowledge message to a last data frame transmitted by said first device.

4. A system for communicating data, comprising:
a first device for transmitting and receiving data;
a second device for transmitting and receiving data; and
a communications network coupled to said first and second devices for transmitting data therebetween in frames;
wherein said first device creates a communications link over said network, wherein said second device transmits to said first device information describing an operating environment of said second device, followed by transmission of data from said first device to said second device, wherein, after such data transmission, said second device transmits, using the same communications link, a data direction turnaround message to said first device, followed by said first device transmitting to said second device information describing an operating environment of said first device, followed in turn by said second device transmitting data to said first device, and wherein said first device and said second device, after they receive each frame, transmit to the other device an acknowledge message to indicate receipt of a data frame.

5. The system of claim 4, wherein the information describing an operating environment includes a number of buffers available for receiving data frames, and a size for the buffers.

6. A method for communicating data between a first device and a second device over a communications network, comprising the steps of:
(a) transmitting data from the first device to the second device, using a communications link, on the communications network;
(b) transmitting a data direction turnaround message from the second device to the first device using the communications link, said turnaround message indicating that the second device is preparing to send data to the first device; and
(c) transmitting data from the second device to the first device using the communications link.

7. The method of claim 6, further comprising the step of:
(d) before step (a), establishing the communications link on the communications network from the first device to the second device.

8. The method of claim 6, wherein data transmitted in steps (a) and (c) is transmitted in frames.

9. The method of claim 8, further comprising:
(e) during step (a), transmitting from the second device to the first device and acknowledgement message for each data frame received by the second device; and (f) during step (c), transmitting from the first device to the second device an acknowledgement message for each data frame received by the first device.

10. The method of claim 9, wherein the data direction turnaround message also functions as the acknowledgement message for the last data frame transmitted in step (a).

11. A method for communicating data between a first device and a second device over a communications network, comprising the steps of:

(a) transmitting from the second device to the first device, using a communications link on the network, information describing an operating environment of the second device;

(b) transmitting data from the first device to the second device, using the communications link;

(c) transmitting a data direction turnaround message from the second device to the first device using the communications link;

(d) transmitting from the first device to the second device information describing an operating environment of the first device; and (e) transmitting data from the second device to the first device using the communications link.

12. The method of claim 11, wherein the operating environment transmitted in step (a) describes a number of buffers in the second device for receiving data, and the size of such buffers, and wherein the operating environment transmitted in step (d) describes a number of buffers in the first device for receiving data, and the size of such buffers.

* * * * *